Patented Nov. 9, 1937

2,098,278

UNITED STATES PATENT OFFICE 2,098,278

MANUFACTURE OF TITANIUM PIGMENTS

Roy Dahlstrom, East Orange, and Lonnie W. Ryan, Westfield, N. J., assignors, by mesne assignments, to National Lead Company, New York, N. Y., a corporation of New Jersey No Drawing. Application November 9, 1933, Serial No. 697,304

16 Claims. (Cl. 23—202)

Our invention relates to new and useful improvements in the manufacture of titanium pigments, particularly to improvements in methods of precipitation by hydrolysis.

It is well-known that hydrated titanium oxide may be precipitated from solutions of titanium sulphate by hydrolysis at or near the boiling temperature. Several methods for the hydrolysis of titanium sulphate solutions at elevated temperatures have been devised. Some of them depend upon the formation of a quantity of nuclei or seed material in the solution or outside the solution. In the latter case the nuclei prepared extraneously are added to the titanium sulphate solution before hydrolysis. These nuclei shorten the time of precipitation and improve the quality of the product.

We have now discovered a method for preparing a new type of titanium nuclei or seed material. We have also discovered how it may be used to shorten greatly the time of hydrolysis of titanium sulphate solutions and to produce a product which, when calcined, has a high degree of purity and high hiding power when used as a pigment. Furthermore, our methods are adaptable to a wide range of concentrations of titanium and acid in the solutions to be hydrolyzed.

At fairly low acid concentrations we have discovered that a precipitate can be prepared from titanium sulphate solutions which, when added to a titanium sulphate solution, greatly increases the amount of the colloidal phase and shortens the initial period during which precipitation is not evident. Furthermore, the total time of precipitation is greatly shortened, and the product is very pure and fine-grained. This is obviously an economical advantage. Our novel method for preparing this precipitate, which will act as nuclei, is as follows:

A solution of titanium is partially neutralized with an alkaline neutralizing agent, such as sodium carbonate or sodium hydroxide, after which the solution is stirred until all turbidity disappears. Then the solution is heated, with or without dilution, for a suitable length of time at a suitable temperature.

These nuclei may also be prepared from orthotitanic acid, in which case the orthotitanic acid is dissolved in the required amount of water containing 1% to 5% sulphuric acid and sufficient sodium sulphate or other alkaline or alkaline-earth metal salts, such as sodium chloride, magnesium sulphate and sodium nitrate, to cause the orthotitanic acid to dissolve completely to a very basic solution. The sodium sulphate, as well as the other salts probably facilitate the dissolving of the orthotitanic acid by complex salt formation, but we make no claim to exact knowledge of the mechanism of reaction involved in this step. After the orthotitanic acid has dissolved completely in the aqueous solution of sulphuric acid and sodium sulphate or other salts, the solution is heated at a suitable temperature for a suitable length of time to precipitate the nuclei.

Our improved method differs from existing methods of preparing nuclei for the precipitation of hydrated titanium oxide in this, that the nuclei formed are not a true colloid which disperses when added to an ilmenite solution at elevated temperatures to form an apparently homogeneous solution.

Our hydrous titanium oxide nuclei are a definite microscopic precipitate which remains as such even when suspended in an ilmenite solution and heated to the boiling point. Our method is also different from existing processes in this respect, that the acidity of the solution from which the nuclei are prepared is much higher than heretofore used. The pH at which these nuclei are prepared is more acid than pH=2.0, that is to say, an acid value not substantially less than pH=2.0 and not substantially greater than pH=1.0.

The temperature and time at which our nuclei are precipitated are interdependent; the higher the temperature at which the precipitation occurs the shorter the time need be. The most desirable temperature range is that between 60° C. and 100° C. Heating is continued until 85% to 95% of the titanium present is precipitated. The time required may vary from 10 minutes to 4 hours.

After precipitation of the nuclei, it is only necessary to add the precipitate to a titanium bearing solution such as a sulphuric acid solution of ilmenite, and then hydrolyze the charge at or near the boiling point until the desired yield of hydrated titanium oxide is obtained. The product is then treated in the usual manner to prepare a pigment of a high degree of purity and high hiding power.

Our nuclei precipitate is not limited in its application to the manufacture of pure titanium oxide, but may be used also in the manufacture of composite pigments such as titanium barium pigments and titanium calcium pigments. The nuclei may be added to the titanium bearing solution either before or after hydrolysis has started, and before, after or simultaneously with the addition of a carrier such as calcium sulphate or barium sulphate to make the composite pigments. The use of our nuclei is also not limited to one type of titanium sulphate solution. The nuclei are effective at both high and low acid concentrations and in both acid and basic titanium solutions.

The amount of titanium sulphate used for preparation of the nuclei may be as high as 15% of the total solution to be hydrolyzed, but 1% or less is also effective.

Having now described our invention, we give in detail six examples, but it is to be understood that our invention is not to be limited to the examples, which are given for illustrative purposes only.

*Example I.*—An ilmenite solution was first prepared in the usual manner with sulphuric acid analyzed:

| | Percent |
|---|---|
| $TiO_2$ | 6.4 |
| $H_2SO_4$* | 20.6 |
| FeO | 6.0 |

*Free and combined with titanium.

Of the titanium, 0.02 lb. per gallon, calculated as $TiO_2$, was in the trivalent state. To 123 pounds of this solution (15% by weight of the total solution to be used for precipitation), 13.7 pounds of sodium carbonate (equivalent to 50% of the sulphuric acid, free and combined with titanium) was added during constant agitation. Sufficient water (60 gallons) was then added to reduce the acidity of the solution to 2.5%. The solution became turbid as the sodium carbonate was added, but upon stirring it soon became clear again. After the solution was clear, it was heated to 100° C., and kept at this temperature for 20 minutes to precipitate the desired nuclei. The solution was then allowed to cool and settle, after which the clear liquor was removed by decantation. The precipitate was added to the main portion of the ilmenite solution (697 pounds), and the whole was boiled 11 hours until about 95% of the titanium was precipitated. The precipitate was then filtered, washed and calcined. A similar solution, boiled without first adding nuclei, yielded after 11 hours, a precipitate of less than 40% of the titanium.

*Example II.*—An ilmenite solution, from which a part of the iron had been removed by crystallization as ferrous sulphate, analyzed as follows:

| | Percent |
|---|---|
| $TiO_2$ | 10.6 |
| FeO | 2.0 |
| $H_2SO_4$* | 31.3 |

*Free and combined with titanium.

Of the titanium, 3.3 grams per liter, calculated as $TiO_2$, was in the trivalent state. To 39.7 pounds of this solution (8% by weight of the total solution to be used for precipitation), 8.1 pounds of sodium hydroxide dissolved in 25 gallons of water (equivalent to 60% of the sulphuric acid, free and combined with titanium) was added during constant agitation. The solution then had an acidity of 2.5%. After this solution became clear, it was boiled for 15 minutes, then allowed to cool and settle. The supernatant liquid was decanted, and the precipitate mixed with 456.2 pounds of the sulphate solution to be precipitated by hydrolysis. After boiling for about 3 hours, 95% of the total titanium present was precipitated. The precipitate was filtered, washed and calcined in the usual manner.

*Example III.*—An ilmenite solution, from which a part of the iron had been removed by crystallization as ferrous sulphate, analyzed as follows:

| | Percent |
|---|---|
| $TiO_2$ | 12.9 |
| FeO | 3.5 |
| $H_2SO_4$* | 21.6 |

*Free and combined with titanium.

Of the titanium, 0.02 lb. per gallon calculated as $TiO_2$ was in the trivalent state. Orthotitanic acid was precipitated by adding 1.44 pounds of sodium hydroxide dissolved in 10 gallons of water to 8.15 pounds of the above ilmenite solution. The precipitate was filtered and washed.

It was then dissolved in an aqueous solution of 0.40 pound of sulphuric acid and 2.3 pounds of sodium sulphate. The total weight of the titanium solution was 26.2 pounds. The solution analyzed:

| | Percent |
|---|---|
| $TiO_2$ | 4.0 |
| $Na_2SO_4$ | 9.0 |
| $H_2SO_4$ | 1.6 |

The pH was 1.5. The solution was then heated to 85° C. and held at that temperature for 90 minutes. At the end of this time about 95% of the titanium was precipitated in a form suitable for use as nuclei. The nuclei precipitate together with its mother liquor was then added to 407 pounds of the same solution as that used for the precipitation of the orthotitanic acid. This solution, containing the nuclei, was heated to boiling and boiled for two hours at which time 95% of the titanium present was precipitated. The precipitate was filtered and washed and calcined in the usual manner.

*Example IV.*—An ilmenite solution, from which a part of the iron had been removed by crystallization as ferrous sulphate, analyzed as follows:

| | Percent |
|---|---|
| $TiO_2$ | 12.20 |
| FeO | 3.70 |
| $H_2SO_4$* | 21.60 |

*Free and combined with $TiO_2$.

Of the titanium, 0.02 lb. per gallon, calculated as $TiO_2$, was in the trivalent state. To 432 pounds of this solution was added 195 pounds of an aqueous blanc fixe pulp containing 150 pounds of barium sulphate. This suspension was boiled for 30 minutes, after which nuclei which had been prepared as described under Example III were added to the extent of 1% of the total titanium oxide to be precipitated by hydrolysis. After 3 hours' boiling, about 95% of the titanium was precipitated. The composite precipitate was then filtered and washed and calcined in the usual manner.

*Example V.*—The following procedure will illustrate how the nuclei may be prepared by the use of sodium chloride.

To 5 gal. of water, 0.6 lb. of sulphuric acid and 10 lb. of sodium chloride were added. Orthotitanic acid equivalent to 2 lb. of $TiO_2$ was dissolved in this solution, and the nuclei were precipitated by heating for 4–5 hours at 80° C. The nuclei were then used in the precipitation of titanium in the same way as described in Example III.

*Example VI.*—As to the use of magnesium sulphate and sodium nitrate, the acid concentration was 1.8 lbs. in 50 lb. of solution. The procedure was the same as in Example V. The solution containing magnesium sulphate dissolved the orthotitanic acid while that containing the sodium nitrate dissolved a part of the orthotitanic acid. In both cases the solution contained 10 lbs. of the salt, 40 lbs. of water, and orthotitanic acid equivalent to 2.0 lb. TiO₂ was added to be dissolved.

In the appended claims the compounds which aid the solution of orthotitanic acid in the presence of a small amount of free acid will be generically designated as "alkaline and alkaline-earth metal salts".

We claim as our invention:—

1. A method of hydrolyzing a sulphuric acid solution of ilmenite, which comprises adding to said solution therein permanently insoluble macroscopic hydrous titanium oxide nuclei obtained by thermal hydrolysis of a sulphuric solution of titanium having a hydrogen ion concentration of pH=1.0 to pH=less than 2.0, and then heating said ilmenite solution containing said nuclei.

2. A method of hydrolyzing a sulphuric acid solution of ilmenite, which comprises heating a sulphuric acid solution of orthotitanic acid having a hydrogen ion concentration of pH=1.0 to pH=less than 2.0 at a sufficiently high temperature and for a sufficient length of time to precipitate by hydrolysis permanent macroscopic hydrous titanium oxide nuclei, adding the resulting nuclei to a sulphuric acid solution of ilmenite, and heating said ilmenite solution containing the therein permanently insoluble nuclei.

3. A method of hydrolyzing a sulphuric acid solution of ilmenite, which comprises heating a sulphuric acid solution of alkali-precipitated titanium compounds having a hydrogen ion concentration of pH=1.0 to pH=less than 2.0 at a sufficiently high temperature and for a sufficient length of time to precipitate by hydrolysis permanent macroscopic hydrous titanium oxide nuclei, adding the resulting nuclei to a sulphuric acid solution of ilmenite, and heating said ilmenite solution containing the therein permanently insoluble nuclei.

4. In a method of hydrolyzing a sulphuric acid solution of ilmenite, the step which consists in heating a sulphuric acid solution of ilmenite containing therein permanently insoluble macroscopic hydrous titanium oxide nuclei obtained by thermal hydrolysis of a sulphuric acid solution of titanium having a hydrogen ion concentration of pH=1.0 to pH=less than 2.0.

5. A method of producing hydrous titanium oxide nuclei for the manufacture of titanium pigments, which comprises adding an alkaline neutralizing agent to a titanium sulphate solution, redissolving in the mother liquor the resulting alkali-precipitated titanium compounds, adjusting the hydrogen ion concentration of the resulting solution from pH=1.0 to pH=less than 2.0, and then heating the solution at a sufficiently high temperature and for a sufficient length of time to precipitate therein by hydrolysis permanent macroscopic hydrous titanium oxide nuclei.

6. A method of producing hydrous titanium oxide nuclei for the manufacture of titanium pigments, which comprises adding an alkaline neutralizing agent to a titanium sulphate solution, redissolving in the mother liquor the resulting alkali-precipitated titanium compounds, adjusting the hydrogen ion concentration of the resulting solution from pH=1.0 to pH=less than 2.0, and then heating the solution at temperatures between 60° C. and 100° C. for from ten minutes to four hours to precipitate therein by hydrolysis permanent macroscopic hydrous titanium oxide nuclei.

7. A method of producing hydrous titanium oxide nuclei from the manufacture of titanium pigments, which comprises dissolving alkali-precipitated titanium compounds in an aqueous solution of a compound selected from the group consisting of sodium sulphate, magnesium sulphate, sodium chloride and sodium nitrate containing sufficient sulphuric acid after dissolution of said alkali-precipitated titanium compounds to cause the resulting solution to have a hydrogen ion concentration of pH=1.0 to pH=less than 2.0, and then heating the solution at a sufficiently high temperature and for a sufficient length of time to precipitate therein by hydrolysis permanent macroscopic hydrous titanium oxide nuclei.

8. A method of producing hydrous titanium oxide nuclei for the manufacture of titanium pigments, which comprises dissolving orthotitanic acid in an aqueous solution of a compound selected from the group consisting of sodium sulphate, magnesium sulphate, sodium chloride and sodium nitrate containing sufficient sulphuric acid after dissolution of said orthotitanic acid to cause the resulting solution to have a hydrogen ion concentration of pH=1.0 to pH=less than 2.0, and then heating the solution at a sufficiently high temperature and for a sufficient length of time to precipitate therein by hydrolysis permanent macroscopic hydrous titanium oxide nuclei.

9. A method of producing hydrous titanium oxide nuclei for the manufacture of titanium pigments, which comprises dissolving alkali-precipitated titanium compounds in an aqueous solution of a compound selected from the group consisting of sodium sulphate, magnesium sulphate, sodium chloride and sodium nitrate containing sufficient sulphuric acid after dissolution of said alkali-precipitated titanium compounds to cause the resulting solution to have a hydrogen ion concentration of pH=1.0 to pH=less than 2.0, and then heating the solution at temperatures between 60° C. and 100° C. for from ten minutes to four hours to precipitate therein by hydrolysis permanent macroscopic hydrous titanium oxide nuclei.

10. A method of producing hydrous titanium oxide nuclei for the manufacture of titanium pigments, which comprises dissolving orthotitanic acid in an aqueous solution of a compound selected from the group consisting of sodium sulphate, magnesium sulphate, sodium chloride and sodium nitrate containing sufficient sulphuric acid after dissolution of said orthotitanic acid to cause the resulting solution to have a hydrogen ion concentration pH=1.0 to pH=less than 2.0, and then heating the solution at temperatures between 60° C. and 100° C. for from ten minutes to four hours to precipitate therein by hydrolysis permanent macroscopic hydrous titanium oxide nuclei.

11. A method of producing hydrous titanium oxide nuclei for the manufacture of titanium pigments, which comprises dissolving alkali-precipitated titanium compounds in an aqueous solution of sulphuric acid containing a compound selected from the group consisting of sodium sulphate, magnesium sulphate, sodium chloride and sodium nitrate, adjusting the hydrogen ion concentration thereof from p=H 1.0 to pH=less than 2.0, and then heating the solution at a sufficient high temperature and for a sufficient length of time to precipitate therein by hydrolysis permanent macroscopic hydrous titanium oxide nuclei.

12. In a method of producing hydrous titanium oxide nuclei, the step which consists in mixing alkali-precipitated titanium compounds and an aqueous solution of sulphric acid and a compound selected from the group consisting of sodium sulphate, sodium chloride, magnesium sulphate and sodium nitrate to dissolve said alkali-precipitated titanium compounds therein.

13. In a method of producing hydrous titanium oxide nuclei, the step which consists in mixing orthotitanic acid and an aqueous solution of sulphuric acid and a compound selected from the group consisting of sodium sulphate, sodium chloride, magnesium sulphate and sodium nitrate to dissolve said orthotitanic acid therein.

14. In a method of producing hydrous titanium oxide nuclei, the step which consists in heating a solution of alkali-precipitated titanium compounds having a hydrogen ion concentration of pH=1.0 to pH=less than 2.0 at a sufficiently high temperature and for a sufficient length of time to precipitate therein by hydrolysis permanent macroscopic hydrous titanium oxide nuclei.

15. In a method of producing hydrous titanium oxide nuclei, the step which consists in heating a solution of orthotitanic acid having a hydrogen ion concentration of pH=1.0 to pH=less than 2.0 at a sufficiently high temperature and for a sufficient length of time to precipitate therein by hydrolysis permanent macroscopic hydrous titanium oxide nuclei.

16. In a method of producing hydrous titanium oxide nuclei, the step which consists in heating a solution of orthotitanic acid having a hydrogen ion concentration of pH=1.0 to pH=1.5 at a sufficiently high temperature and for a sufficient length of time to precipitate therein by hydrolysis permanent macroscopic hydrous titanium oxide nuclei.

ROY DAHLSTROM.
LONNIE W. RYAN.

CERTIFICATE OF CORRECTION.

Patent No. 2,098,278.                                          November 9, 1937.

ROY DAHLSTROM, ET AL.

It is hereby certified that error appears in the printed specification of the above numbered patent requiring correction as follows: Page 1, second column, line 18, for the word "microscopic" read macroscopic; and that the said Letters Patent should be read with this correction therein that the same may conform to the record of the case in the Patent Office.

Signed and sealed this 1st day of February, A. D. 1938.

(Seal)                                                             Henry Van Arsdale,
                                                                                             Acting Commissioner of Patents.

oxide nuclei, the step which consists in mixing alkali-precipitated titanium compounds and an aqueous solution of sulphric acid and a compound selected from the group consisting of sodium sulphate, sodium chloride, magnesium sulphate and sodium nitrate to dissolve said alkali-precipitated titanium compounds therein.

13. In a method of producing hydrous titanium oxide nuclei, the step which consists in mixing orthotitanic acid and an aqueous solution of sulphuric acid and a compound selected from the group consisting of sodium sulphate, sodium chloride, magnesium sulphate and sodium nitrate to dissolve said orthotitanic acid therein.

14. In a method of producing hydrous titanium oxide nuclei, the step which consists in heating a solution of alkali-precipitated titanium compounds having a hydrogen ion concentration of pH=1.0 to pH=less than 2.0 at a sufficiently high temperature and for a sufficient length of time to precipitate therein by hydrolysis permanent macroscopic hydrous titanium oxide nuclei.

15. In a method of producing hydrous titanium oxide nuclei, the step which consists in heating a solution of orthotitanic acid having a hydrogen ion concentration of pH=1.0 to pH=less than 2.0 at a sufficiently high temperature and for a sufficient length of time to precipitate therein by hydrolysis permanent macroscopic hydrous titanium oxide nuclei.

16. In a method of producing hydrous titanium oxide nuclei, the step which consists in heating a solution of orthotitanic acid having a hydrogen ion concentration of pH=1.0 to pH=1.5 at a sufficiently high temperature and for a sufficient length of time to precipitate therein by hydrolysis permanent macroscopic hydrous titanium oxide nuclei.

ROY DAHLSTROM.
LONNIE W. RYAN.

CERTIFICATE OF CORRECTION.

Patent No. 2,098,278.  November 9, 1937.

ROY DAHLSTROM, ET AL.

It is hereby certified that error appears in the printed specification of the above numbered patent requiring correction as follows: Page 1, second column, line 18, for the word "microscopic" read macroscopic; and that the said Letters Patent should be read with this correction therein that the same may conform to the record of the case in the Patent Office.

Signed and sealed this 1st day of February, A. D. 1938.

(Seal)

Henry Van Arsdale,
Acting Commissioner of Patents.

CERTIFICATE OF CORRECTION.

Patent No. 2,098,278.                                November 9, 1937.

ROY DAHLSTROM, ET AL.

It is hereby certified that error appears in the printed specification of the above numbered patent requiring correction as follows: Page 1, second column, line 18, for the word "microscopic" read macroscopic; and that the said Letters Patent should be read with this correction therein that the same may conform to the record of the case in the Patent Office.

Signed and sealed this 1st day of February, A. D. 1938.

(Seal)

Henry Van Arsdale,
Acting Commissioner of Patents.